April 7, 1925.  
W. R. GREEN  
TIRE CARRIER  
Filed Feb. 1, 1922  
1,532,137  
3 Sheets-Sheet 1
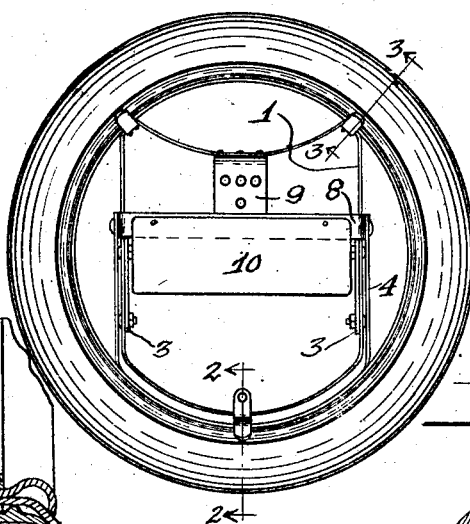
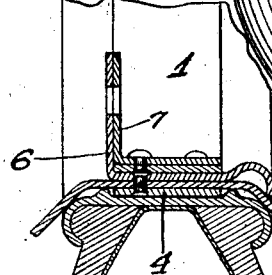
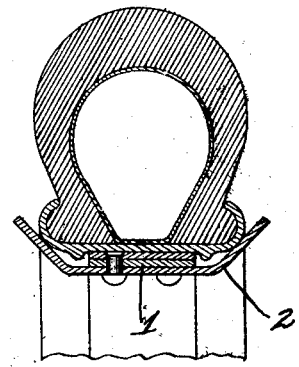
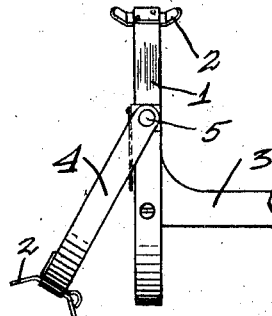
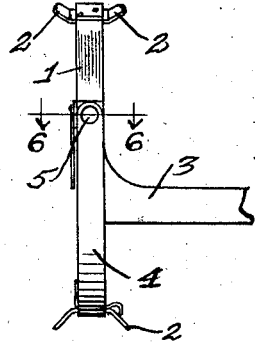
WALTER R. GREEN, April 7, 1925.
W. R. GREEN
TIRE CARRIER
Filed Feb. 1, 1922
1,532,137
3 Sheets-Sheet 2
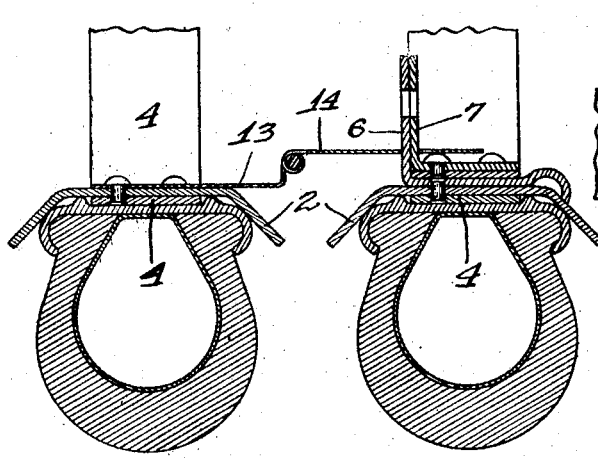
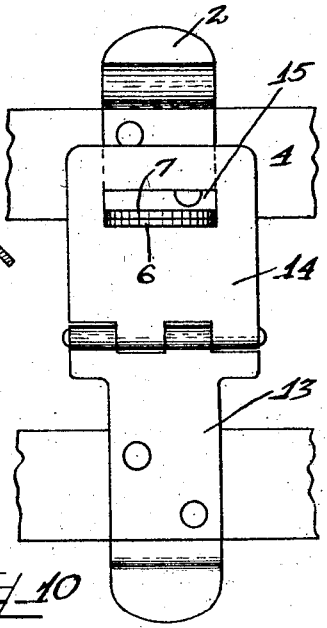
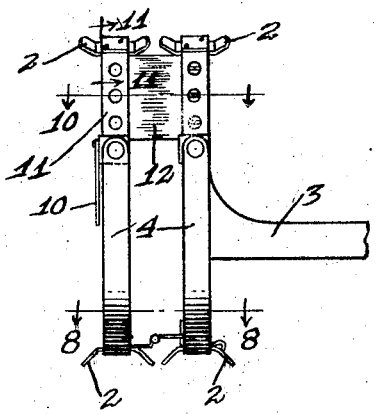
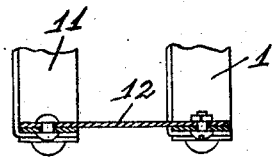
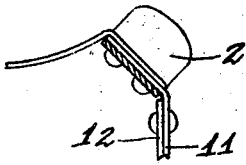
Inventor
WALTER R. GREEN.

April 7, 1925.  
W. R. GREEN  
TIRE CARRIER  
Filed Feb. 1, 1922 3 Sheets-Sheet 3
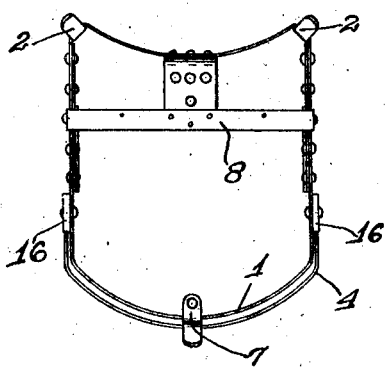
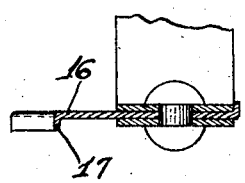
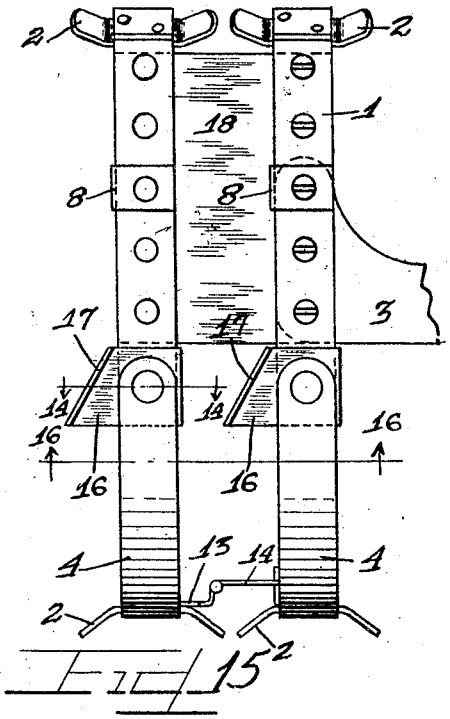
Witnesses  
Rudolph T. Berg.  
Carlton Hill
Inventor  
WALTER R. GREEN.  
By Charles W. Hill Atty.

Patented Apr. 7, 1925.

1,532,137

UNITED STATES PATENT OFFICE.

WALTER R. GREEN, OF CHICAGO, ILLINOIS.

TIRE CARRIER.

Application filed February 1, 1922. Serial No. 533,208.

*To all whom it may concern:*

Be it known that I, WALTER R. GREEN, a citizen of the United States, and a resident of the city of Chicago, in the county of Cook and State of Illinois, have invented certain new and useful Improvements in a Tire Carrier; and I do hereby declare that the following is a full, clear, and exact description of the same, reference being had to the accompanying drawings, and to the numerals of reference marked thereon, which form a part of this specification.

This invention relates to tire carriers for automobiles.

In cases where a tire is fairly rigid and stiff and especially where it is mounted upon a demountable rim, it is often a long and difficult task to remove the tire from the carrier. To overcome this difficulty and facilitate the removal of the tire from the carrier and the restoration of one thereon, the carrier is made flexible so that one part thereof may be flexed or pivoted in relation to another part preferably upon axes through a chord of the circle defined by the tire.

It is therefore an object of this invention to provide a simple and economical tire carrier that can be flexed for the purpose of removing or restoring a tire.

It is a further object of this invention to provide a tire carrier to which a supplemental carrier may be easily added.

With these and other objects in view, which will become more apparent in the following description and disclosures, this invention comprises the novel mechanism and combinations hereinafter described and more particularly pointed out and defined in the appended claims.

In the accompanying drawings which illustrate certain preferred embodiments of this invention and in which similar reference numerals refer to similar features in the different views:

Figure 1 is a rear elevation of my improved tire carrier with a tire supported thereon.

Figure 2 is an enlarged section on the line 2—2 of Figure 1.

Figure 3 is a section on the line 3—3 of Figure 1 upon an enlarged scale.

Figure 4 is a side elevation of the tire carrier per se.

Figure 5 is a side elevation of the carrier similar to Figure 4 but with the swingable portion in a different position.

Figure 6 is a section upon the line 6—6 of Figure 4 upon an enlarged scale.

Figure 7 is a side elevation of the carrier with a supplemental carrier attached thereto.

Figure 8 is a section upon an enlarged scale of the carrier and supplemental carrier.

Figure 9 is a top plan view of the structure as shown in Figure 8 upon an enlarged scale.

Figure 10 is a section on the line 10—10 of Figure 7 upon an enlarged scale.

Figure 11 is a section on the line 11 of Figure 7 upon an enlarged scale.

Figure 12 is a rear side elevation of a modified form of carrier.

Figure 13 is a side elevation of the modified form of carrier upon an enlarged scale.

Figure 14 is a section on the line 14—14 of Figure 13 upon an enlarged scale.

Figure 15 is a fragmentary side elevation of the right hand carrier shown in Figure 13 illustrating the swingable section coacting with a stop.

Figure 16 is a section on the line 16—16 of Figure 13 with one of the pivoted sections swung outwardly.

As shown on the drawings:

In Figures 1 to 6 of the accompanying drawing, I have illustrated a tire carrier comprising a closed metal band whose ends may be riveted together and having an upper concave portion, the ends of which terminate in short, downwardly inclined, straight portions designed to form supports for the tire holding means which are in the form of outwardly flaring metal strips 2 bolted or secured transversely upon said inclined portions so as to extend a suitable distance upon each side of the band 1 to embrace portions of the tire or the rim thereof. From the said inclined portions the metal band extends vertically downwardly a suitable distance according to the diameter of the tire and the lower portion is concave to conform to the curvature of the tire. Brackets 3 are adapted to be attached interiorly of the sides of the carrier for supporting the same from the chassis of an automobile. A swingable U-shaped member 4 is pivoted to the sides of the band 1 upon an axis 5 which represents a chord of the circle defined by the tire. In its normal position, said swingable member surrounds the metal band below the axis 5 and at its lowest point is provided with a tire holding means 2 similar to the ones above described, and a locking bracket 6 in the form of an angle iron having one flange thereof secured to the member 4 above the tire holding prong 2 and having a curved resilient end bearing upon prong 2, and exercising a latching effect when the member 4 is swung to normal position, the other flange of said locking bracket being adapted to abut a flange of a similar bracket 7 secured upon the lowermost point of the band 1. The abutting flanges of said brackets are provided with alined apertures adapted for receiving the hasp of a padlock or the like whereby the swingable section may be locked to the metal band 1, to prevent theft of the tire, since the tire cannot be removed until the U-shaped member 4 is swung outwardly as shown in Figure 5. It is evident that as the member 4 is swung outwardly, the tire carrier is flexed so as to shorten the distance between the upper prong 2 and the lower prong, so that the binding effect of the tire or its demountable rim upon the carrier ceases whereby a tire may be readily removed or restored.

If desirable a strip 8 may be secured at its ends between the band 1 and the swingable member 4 by the pivoted connections thereof and a plate member 9 attached to the upper concave portion of the carrier and attached to said strip for bracing the same and said carrier, the strip 8 affording a support for the license plate 10.

It should be understood that the term tire is intended to include the spares carried on automobiles whether the same be mounted upon demountable rims or not.

In Figures 8 to 11 I have illustrated a supplemental carrier attached to the main carrier. This supplemental carrier comprises an upper U-shaped portion 11 which may be similar to the upper portion of the closed band member 1 and a lower U-shaped member 4 pivoted thereto, and swingable for removing and restoring tires in respect thereto. The two pivoted sections 4 and 11 are provided with the aforedescribed tire holding prongs 2 and plate members 12 are riveted to the sides of the members 11 and bolted or otherwise secured to the band 1 of the main carrier and in suitable spaced relation therewith. When a supplemental carrier is used, the same is provided with a support for sustaining the license plate as previously explained. In order to lock the swingable section 4 of the supplemental carrier so that it cannot be swung for removing a tire by an unauthorized person, a hinge member 13 is secured thereto which is provided with a slot 15 adapted to receive the locking brackets 6 and 7 on the main carrier and be positioned beneath the lock thereof so that the hinge member 4 cannot be swung out of engagement with the locking brackets 6 and 7 until the lock is removed.

In Figures 12 to 16, there is illustrated a slight modification over the previously described structures. The main carrier 1 and the supplemental carrier attached thereto, have slightly different proportions in that the swingable members 4 are somewhat shorter than in the other constructions and are constrained in their swinging movements by stops 16 which consist of short metal pieces secured to the sides of the carriers upon the pivots of the swingable members 4 and project rearwardly therefrom; being provided with inclined stop lips 17 adapted for arresting the swingable members 4 as shown in Figures 15 and 16.

In this modified construction the supplemental carrier is attached to the main carrier by a relatively deep plate member 18 riveted or secured to the supplemental member and screwed or bolted to the main carrier, and each may be provided with a support 8 for a license plate as in the other structures and they may be locked together by the means shown and described in reference to Figures 8 and 9, and the carriers may be equipped with the same tire holding prongs 2 as described in the other constructions.

From the foregoing, it is apparent that I have devised a tire carrier in which a portion is flexible or swingable which can be swung outwardly for readily removing and restoring a tire and which when swung to its normal position draws the tire tautly on the carrier, and in which a supplemental carrier can be readily applied and locked thereto.

I am aware that numerous details of construction may be varied through a wide range without departing from the principles of this invention, and I therefore do not purpose limiting the patent granted otherwise than necessitated by the prior art.

I claim as my invention:

1. In a tire carrier, a main tire carrier having a pivoted section, a supplemental carrier having a swingable section attached thereto, and hinged means for locking said supplemental carrier to the main carrier against swinging movement.

2. In a tire carrier, a frame member having tire supporting means upon its upper portion, a U shaped member pivoted thereto and overlapping the lower portion thereof, and having tire retaining means thereon, an apertured element upon each member, said elements being normally in abutting relation, and a supplemental tire carrier pivoted to said member, and a hinged locking member on said supplemental carrier engaging over said elements.

3. In a tire carrier, a closed frame having tire retaining prongs upon its upper portion, a substantially U shaped member pivoted to said frame and encompassing the lower portion thereof and having tire retaining prongs thereon, said U shaped member being swingable relatively to said frame, and locking plates upon said members adapted to be brought into abutting relation when said U shaped member encompasses said frame.

4. In a tire carrier, a pair of tire supporting members rigidly connected together at their upper portions and comprising lower substantially U shaped swingable members and means for locking said members against unauthorized swinging movements.

5. A tire carrier comprising a frame having sides and a lower arcuate portion, a substantially U shaped member pivoted to the sides of said frame and swingable over said arcuate portion and means for locking said U shaped member to said frame.

6. A tire carrier comprising a pair of tire supporting members rigidly connected together at their upper ends and having lower arcuate surfaces, and substantially U shaped tire supporting members pivoted to said first mentioned members and encompassing said arcuate portions.

7. In a tire carrier, a closed frame member having a lower arcuate surface, a substantially U shaped member pivoted thereto and normally encompassing said arcuate surface, a supplemental carrier having a portion rigidly connected to said frame and a portion swingable relatively thereto and means for locking said swingable portions to said frame.

8. A tire carrier comprising an upper tire supporting portion and a lower substantially U shaped swingable portion pivoted to the upper portion.

In testimony whereof I have hereunto subscribed my name in the presence of two subscribing witnesses.

WALTER R. GREEN.

Witnesses:
 CARLTON HILL,
 JAMES M. O'BRIEN.